J. G. CLARK.
Cotton-Planter.

No. 58,381. Patented Oct. 2, 1866.

Witnesses:
David Murray
Wm M. Harnish

Inventor:
John G Clark

UNITED STATES PATENT OFFICE.

JOHN G. CLARK, OF MIDDLETOWN, OHIO.

IMPROVEMENT IN MACHINES FOR PLANTING COTTON-SEED.

Specification forming part of Letters Patent No. 58,381, dated October 2, 1866.

*To all whom it may concern:*

Be it known that I, JOHN G. CLARK, of Middletown, in the county of Butler and State of Ohio, have invented a new and useful Improvement in Machines for Planting Cotton-Seed; and I do hereby declare that the following is a full and exact description thereof, reference being had to the accompanying drawings, and to the letters of reference marked thereon.

Figure 1:
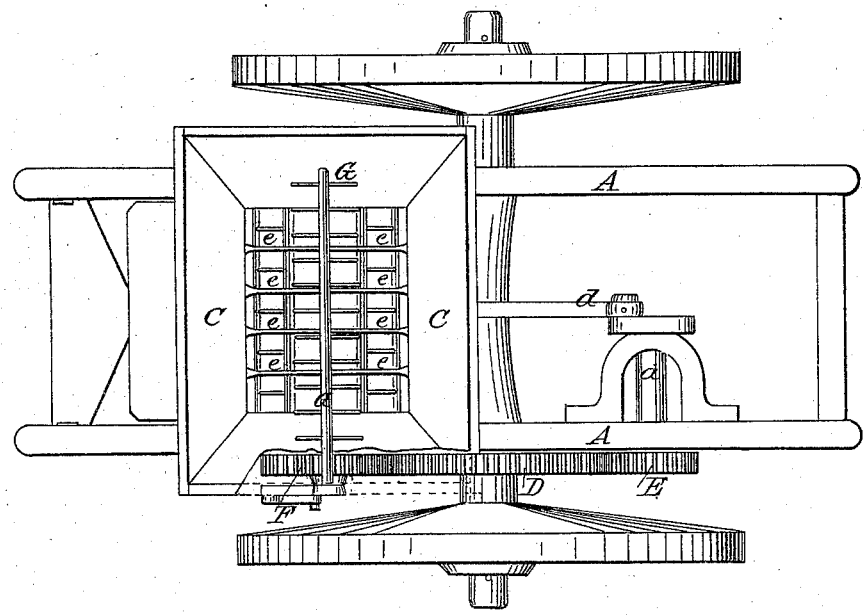
Figure 3:
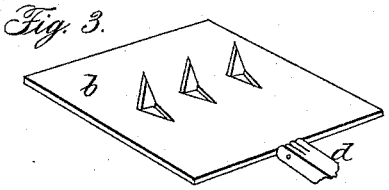
Figure 2:
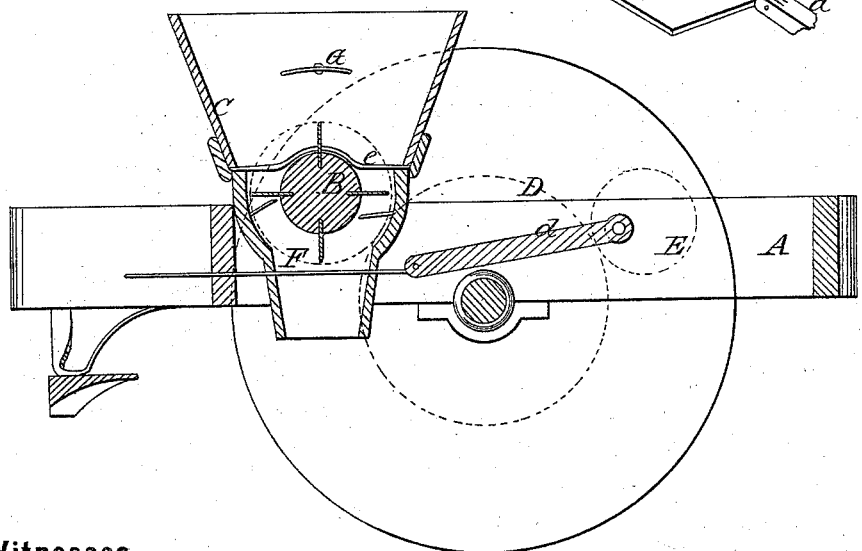

Figure 1 represents a top view of my machine, with a part of the hopper broken away to exhibit the gearing and agitator crank and pitman. Fig. 2 is a vertical section longitudinally, showing the feeding-roll, fixed teeth, and toothed slide, with the hopper and its ribs above the feed-roll.

The use of other seeding-machines adapted for corn-planting and other kinds of grain has been found impracticable for planting cotton-seeds, from the fact that these seeds as they come from the cotton-gin are covered with a coat of the fibers, which tenaciously adhere to them and cause them to compact in the hopper. To cause the mass of seeds to be properly separated and discharged with regularity, a machine for planting cotton-seeds must be provided with suitable mechanism to effect this purpose of breaking up the mass and separating a definite portion of seeds therefrom, which must be discharged and planted with regularity.

To overcome the difficulties of planting cotton-seed by machinery many devices have been employed for the purpose, and generally these machines have been constructed with all the devices which operate upon the seeds having a positive movement, either revolving or reciprocating; and most of the cotton-seed planters introduced have not been entirely successful in separating from the mass of seeds in the hopper a definite quantity at regular intervals. In order to remedy the practical difficulties referred to, I have, among other improvements, employed stationary teeth in the hopper, so arranged in relation to the revolving toothed cylinder as to serve as a stationary rake, which prevents the mass of seeds from being crowded toward the bottom of the hopper, and also to cause a small portion of seeds to fall back from the mass which might be brought up from the bottom of the hopper by the revolutions of the toothed cylinder.

To enable others to make and use my invention, I will describe it with reference to the drawings which are made a part of this specification.

The machine is supported and carried upon two wheels and an axle with a suitable frame, A A, for supporting the gearing, hopper, and actuating mechanism. B indicates the toothed cylinder, arranged within hopper C. The gear-wheel D on the axle meshes into the small pinion E, and the latter operates the crank-shaft *a*, causing the toothed and perforated hopper-slide *b* to reciprocate by the action of the pitman *d*, which is connected to the crank on shaft *a* and to slide *b*. The wheel D also meshes into toothed pinion F on the end of the journal of cylinder B. Across the center of the hopper C is a shaft, G, provided with two sets of agitating-teeth, and at the gear side of the machine this agitator-shaft G is provided with a crank, which is connected by a pitman with a crank-pin on the outer face of gear-pinion F. The hopper C is also furnished with curved ribs or slats *e e*, which extend across it over the toothed cylinder B, and the latter is provided with four rows of teeth of five in each row, which, as the cylinder revolves, extend up between the ribs *e e*, and also pass between the teeth of the two rows of stationary teeth extending inwardly from the sides of the hopper, near its bottom. The lower part of the hopper sides is concave, corresponding with the circle of the revolving toothed cylinder B.

The stationary teeth in the concave portions of the hopper are arranged to stand in a line tangential to the cylinder, so as to point toward the mass of cotton-seeds which is being moved forward by the action of the cylinder-teeth during its revolutions.

The main wheels, which carry the machine, are permanently secured to the axle, and the latter is therefore caused to revolve with the former, and actuate the large gear-wheel D, which actuates the pinion E on shaft *a*, and by the crank and pitman connected therewith and with the toothed slide the latter is caused to move horizontally back and forth under or through the bottom part of the hopper C. The wheel D also actuates the rock-shaft G through gear-wheel F and pitman connecting it to the crank on the end of agitator-shaft G, and this pinion F, being on the end of the journal of the toothed cylinder B, gives to it a revolving motion.

From the foregoing description of the construction of my machine it will be observed that in operating it for planting cotton-seeds the seeds are positively acted upon by the toothed cylinder, the agitator, and the toothed slide, while, negatively, the ribs e e and fixed teeth projecting from the sides of the concave portion of the hopper affect the operation of the positively-acting devices and materially modify the result which would be produced without these fixed devices.

The agitator-shaft may be armed with but one set of arms, which, instead of projecting from its side, may project from the bottom of the shaft. When so constructed or arranged, the agitator will serve to raise up and open out the mass of seeds in the hopper. The ribs serve to retain the greater body of seeds in the hopper above the cylinder, the teeth of which, as the cylinder revolves, will draw a portion of seeds below the ribs and force them, separated from each other, onto the reciprocating toothed and perforated hopper bottom or side. The teeth projecting up from the hopper-bottom (which operates as a slide with discharge-openings) assist in the work of regulating the discharge of the seeds.

In certain conditions of the seed, as when more fibrous, damp, or compact, the ribs e e will not be required, or a portion of them may be dispensed with; also, more or less of the fixed teeth of the hopper may be employed. In constructing a full-sized working machine, these parts may be so attached with nuts and screws as to be readily removed.

The operation of the machine will be understood from the above description. The hopper being filled with cotton-seeds, they are first subjected to the action of the agitator, then drawn down by the teeth of the cylinder, and finally acted upon by the teeth of the reciprocating slide. The teeth in the hopper which point at an angle upward serve to prevent clusters of seeds from being carried down without being separated, and in case the quantity carried to the bottom should become bulky, so as to tend to interfere with the regularity of the discharge, then the teeth of the cylinder will carry the mass upward and force a portion between the hopper-teeth which point downward from a horizontal line.

It is evident that the gearing may be so varied as to give to the moving devices any necessary speed desired, to effectually separate the seeds and discharge them with regularity, whatever condition the seeds may be in. In planting certain qualities of seeds the action of the agitator may be dispensed with, or the extent of its movement may be varied.

It is apparent that two reciprocating slides may be used instead of one, by simply employing a double crank. As the seeds pass through the perforated slide they will fall into the conductor-hose, which conducts them into the soil, and the V-shaped concave block X, attached to the rear end of the frame, will move the soil outwardly above a certain level by its receding front sides, while the inclined concave portion or bottom of the block will gather and compress the soil over the seeds as the machine progresses, thus covering them to a regular depth.

Having now fully described my invention, what I claim, and desire to secure by Letters Patent, is—

1. The toothed cylinder B, in combination with the toothed reciprocating slide or slides, constructed, arranged, and operating in the manner substantially as described.

2. The combination of the agitator with the cylinder B and ribs e e, operating substantially as specified.

3. The hopper-teeth arranged tangentially in relation to the cylinder, in combination with the positively-operating devices for separating and discharging the seed, substantially as and for the purpose described.

In testimony whereof I have hereunto set my hand this 13th day of April, 1866.

JOHN G. CLARK.

Witnesses:
H. P. K. PECK,
WM. M. HARNISH.